United States Patent Office 2,806,878
Patented Sept. 17, 1957

2,806,878
ACRYLIC ACID PREPARATION

Benjamin J. Luberoff, Stamford, Conn., assignor to American Cyanamid Company, New York, N. Y., a corporation of Maine No Drawing. Application November 4, 1955,
Serial No. 545,119

6 Claims. (Cl. 260—526)

This invention relates to the preparation of acrylic acid. More particularly, it relates to the preparation of acrylic acid from low homopolymeric esters thereof. More specifically, it is concerned with the preparation of acrylic acid from β-carboxyethylacrylate.

It is known that homopolymeric esters of acrylic acid are formed during monomeric acrylic acid production due to the ease of the acid's tendency to polymerize. Heretofore this polymerization product, which contributes to losses in overall monomeric acrylic acid yield, is usually discarded.

It is an object of the invention to present a process for the conversion of such homopolymerization products to the corresponding monomers, thus avoiding overall monomeric acrylic acid yield loss.

To this end, acrylic acid can be prepared by the thermal depolymerization of a homopolymeric acrylic acid ester product in the presence of a depolymerization catalyst. While β-carboxyethylacrylate is illustratively treated in the following description, any homopolymeric polymer represented by the formula below may be used:

$$CH_2=CHCOO(CH_2CH_2COO)_nH$$

where $n$ is an integer greater than zero, and preferably from one to four.

According to the present invention, a small amount of a depolymerization agent is added to a homopolymeric acrylic ester of the type above described, in a vessel suitably equipped for effecting distillation. The contents in the vessel are slowly heated to not more than about 85° C. whereby distillation occurs. The distillate is collected and recovered as principally monomeric acrylic acid.

A wide variety of depolymerization catalysts can be used. However, the depolymerization catalyst contemplated herein is a non-volatile Friedel Crafts type catalyst. Illustrative of the latter are: sulphuric acid, phosphoric acid, benzene sulfonic acid, para toluenesulfonic acid, or acid salts, such as potassium bisulfate or aluminum chloride. In practice, the preferred depolymerization catalyst is sulfuric acid because of the acid's favorable cost and availability. The amount of depolymerization catalyst which is to be used will vary with the particular catalyst. In general, it has been found advantageous to use from about 1% to about 5% by weight of catalyst based on the weight of the homopolymeric product used. It is found that when larger amounts are used, such larger quantities do not materially aid in effecting the necessary degree of depolymerization.

Any homopolymeric acrylic acid ester can be treated in accordance with the principles of the present invention. More particularly, a homopolymeric ester of the type:

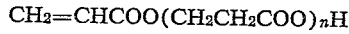
$$CH_2=CHCOO(CH_2CH_2COO)_nH$$

where $n$ is an integer preferably from 1–4, can be advantageously treated. Mixtures of such esters are also contemplated. In the examples below, β-carboxyethylacrylate is illustrated. This compound may be conveniently prepared from an acetylene-carbon monoxide reaction disclosed in United States Letters Patent 2,613,222. However, as stated previously, any homopolymeric acrylic acid ester of the type defined above which may be derived from any other source can be utilized.

The depolymerization reaction may be carried out either at atmospheric pressure or at sub-atmospheric pressure. However, sub-atmospheric pressure is preferred because the utilization of such pressure tends to repress polymer re-formation. The pressures below 100 mm. Hg, and preferably within 10–50 mm. Hg, appear to be best suited for the successful operation of the present process.

The depolymerization temperatures which are most advantageous for accomplishing the process of the invention are maintained between about 35° C. and 85° C. Where sub-atmospheric pressures are employed, it is preferred to utilize temperatures within the range of from about 45° C. to 65° C. to effect substantially complete depolymerization of any aforementioned homopolymer.

The following specific examples are illustrative only, and the invention is not to be construed as being limited thereto. Unless otherwise noted, the parts are by weight.

*Example 1*

Two parts of 95% sulphuric acid are added to 50 parts of β-carboxyethylacrylate in a vessel suitably equipped for effecting distillation. The contents therein are slowly heated under 40 mm. Hg pressure and the distilling head temperature maintained at or below 65° C. Under these conditions, a distillate is collected which accounts for 45 parts of acrylic acid of 90% purity.

*Example 2*

To 50 parts of β-carboxyethylacrylate are added 1 part of 85% phosphoric acid. The contents are placed in a vessel suitably equipped for effecting distillation as in Example 1. The contents are slowly heated under decreased pressure until the distilling head temperature at 25 mm. Hg pressure is 55° C.–56° C. The distillate constitutes approximately 40 parts of acrylic acid of 95% purity.

*Example 3*

The procedure of Example 1 is repeated except that potassium bisulfate is substituted for the sulfuric acid. The recovered amount of acrylic acid is substantially the same as that shown therein.

I claim:

1. In the process of preparing acrylic acid from homopolymeric esters thereof the steps which comprise: adding a small amount of non-volatile Friedel-Crafts type catalyst to a homopolymeric acrylic ester represented by the formula:

$$CH_2=CHCOOCH_2CH_2COOH$$

slowly heating and distilling the mixture while maintaining a temperature at between about 35° C. and about 85° C. under a reduced pressure below about 100 mm. Hg; and collecting acrylic acid as a distillate.

2. The process according to claim 1 in which the depolymerization catalyst is concentrated sulfuric acid.

3. The process according to claim 1 in which the depolymerization catalyst is concentrated phosphoric acid.

4. The process according to claim 1 in which the distilling temperature is 65° C. and the pressure is 40 mm. Hg.

5. The process of preparing acrylic acid from β-carboxyethylacrylate which consists in the steps of: adding a small amount of sulfuric acid to β-carboxyethylacrylate; slowly heating and distilling the so prepared mixture while maintaining a distilling temperature of 65° C. under reduced pressure of about 40 mm. Hg; and collecting acrylic acid as a distillate.

6. The process of preparing acrylic acid from β-carboxyethylacrylate which consists in the steps of: adding a small amount of phosphoric acid catalyst to β-carboxyethylacrylate; slowly heating and distilling the so-formed mixture while maintaining a distilling temperature at about 55° C. under a reduced pressure of about 25 mm. Hg; and collecting acrylic acid as distillate.

References Cited in the file of this patent

UNITED STATES PATENTS

| 2,030,901 | Strain | Feb. 18, 1936 |
| 2,613,222 | Specht | Oct. 7, 1952 |
| 2,721,858 | Joyner et al. | Oct. 25, 1955 |

FOREIGN PATENTS

| 667,825 | Great Britain | Aug. 20, 1952 |

OTHER REFERENCES

Sherllin et al.; Chem. Abst., vol. 32, col. 5398 (1938).